(12) United States Patent
Bloom

(10) Patent No.: US 9,821,518 B2
(45) Date of Patent: Nov. 21, 2017

(54) PRECISION PLATFORM ASSEMBLY FOR THREE-DIMENSIONAL PRINTER

(71) Applicant: Daniel A. Bloom, Hartford, VT (US)

(72) Inventor: Daniel A. Bloom, Hartford, VT (US)

( * ) Notice: Subject to any disclaimer, the term of this patent is extended or adjusted under 35 U.S.C. 154(b) by 187 days.

(21) Appl. No.: 14/825,211

(22) Filed: Aug. 13, 2015

(65) Prior Publication Data

US 2016/0052207 A1    Feb. 25, 2016

Related U.S. Application Data

(60) Provisional application No. 62/039,248, filed on Aug. 19, 2014.

(51) Int. Cl.
    *B29C 67/00*      (2017.01)
    *B33Y 30/00*      (2015.01)

(52) U.S. Cl.
    CPC ...... *B29C 67/0085* (2013.01); *B29C 67/0055* (2013.01); *B33Y 30/00* (2014.12)

(58) Field of Classification Search
    CPC ................................................ B29C 67/0085
    See application file for complete search history.

(56) References Cited

U.S. PATENT DOCUMENTS

| | | | |
|---|---|---|---|
| 5,236,637 A | 8/1993 | Hull | |
| 5,506,607 A | 4/1996 | Sanders, Jr. et al. | |
| 5,573,722 A | 11/1996 | Hull | |
| 6,554,600 B1 | 4/2003 | Hofmann et al. | |
| 6,821,473 B2 | 11/2004 | Hiizumi et al. | |
| 7,004,222 B2 | 2/2006 | Ederer et al. | |
| 7,357,629 B2 | 4/2008 | Weiskopf et al. | |
| 7,568,904 B2 | 8/2009 | Koyagi et al. | |
| 8,105,527 B2 | 1/2012 | Wahlstrom | |
| 2001/0042942 A1 | 11/2001 | Hizumi et al. | |
| 2010/0100222 A1* | 4/2010 | Skubic ................ | B29C 67/0085 700/110 |
| 2014/0085620 A1 | 3/2014 | Lobovsky et al. | |
| 2014/0220168 A1 | 8/2014 | Perez et al. | |

* cited by examiner

*Primary Examiner* — Timothy Kennedy
(74) *Attorney, Agent, or Firm* — Jeffrey E. Semprebon

(57) ABSTRACT

A platform assembly has a rigid support with an array of threaded passages extending therethrough; threaded posts are engaged in the threaded passages and extend above the rigid support by a distance adjusted by rotation of each threaded post in its associated threaded passage. Manually-adjusted dog point screws can provide the threaded posts, and self-locking nuts can provide the threaded passages. A platform of smooth, slightly flexible material extends over the threaded posts and has an array of mounting elements that magnetically attach to the threaded posts to hold the platform tightly against the end of each post. Adjusting the positions of the threaded posts serves to adjust the precise position and flatness of the platform surface relative to the rigid support, and with respect to a print head of a 3D printer in which the rigid support is incorporated.

6 Claims, 5 Drawing Sheets

PRECISION PLATFORM ASSEMBLY FOR THREE-DIMENSIONAL PRINTER

FIELD OF THE INVENTION

The present invention relates to a platform which can be repeatably positioned precisely and with a high degree of flatness to provide a surface suitable for use as a build platform for a 3D printer.

BACKGROUND

Three-dimensional printers fabricate parts by applying material in layers onto a build surface; the build surface provides a substrate onto which the material is sequentially applied to gradually form the desired structure of the part. In one class of printers, molten material is applied in layers and solidifies as it cools.

In a typical example, a print head that applies the molten material is mounted to move along X and Y axes in a horizontal plane, and the build platform is mounted to a horizontal support that is vertically movable along the Z axis relative to the plane in which the print head moves. In other printers, the movements along the axes may differ such that the horizontal support may provide the X- or Y-axis motion relative to the print head. In all cases, to fabricate a part, the horizontal support is moved relative to the print head to place the build platform very close to the movement plane of the print head, which then moves within the horizontal plane to apply an initial layer of material onto the platform. Once the initial layer is applied to the platform surface, the horizontal support is sequentially moved away from the movement plane of the print head to apply subsequent layers to build up the part.

For accuracy, the build surface should be parallel to the plane in which the print head moves. Some discrepancy in such parallelism can be overcome by applying an initial layer of material that varies in thickness to provide a surface that is planar relative to the plane of the print head; however, this approach is wasteful of both time and material. To align the platform with the plane of the print head, printers typically employ an array of set screws that extend between the platform (or a subframe to which a removable platform is attached by clips) and the horizontal support to allow fine adjustment of the orientation of the platform relative to the horizontal support. Compression springs that encircle the set screws serve to tension the platform and, to some degree, serve to maintain the position of the screws once adjusted. In practice, the screws frequently loosen in use, requiring frequent readjustment. Additionally, since only a small number of screws are employed to level the platform (or subframe), and the adjustment procedure is tedious as adjusting one screw alters the level of the entire platform relative to the other screws, requiring them to be further adjusted in an iterative procedure.

An additional problem results when the build surface is not sufficiently planar. In such cases, the initial layer of material may have an uneven layer thickness that can cause the incomplete part to peel from the build surface due to uneven thermal contraction as additional layers of material are applied and then cool.

The platform assembly of the present invention overcomes the above limitations while remaining simple and economical, so as to provide significantly improved performance for 3D printers suitable for consumer use.

SUMMARY

The platform assembly of the present invention is designed to provide an improved structure for adjusting a platform surface relative to the plane in which a print head moves, as well as to provide a surface having a high degree of flatness, while reducing the effort required by the operator. The platform assembly has particular utility for build platforms employed in small 3D printers that apply layers of molten material, where providing a flat, level surface on which to deposit the material is important to obtaining proper adhesion of the initial layer of material onto the build platform. Having the surface flat and level helps assure that an even thickness of the material is initially applied to the surface, in order to avoid peeling due to shrinkage as subsequent layers are applied. Since the layers of material deposited are very thin, the platform surface must be level relative to the plane in which the print head moves and should conform to a plane with a high degree of precision, such as within the range of one thousandth of an inch.

The platform assembly has a rigid support which extends along a reference plane (typically horizontal), which is movably mounted relative to the print head so as to provide movement along at least an axis perpendicular to the reference plane to allow forming sequential layers. Additional movement of the print head relative to the rigid support provides the print head motion in a print head plane that is parallel to the reference plane, allowing the print head to move across the rigid support when applying a layer of material in a desired configuration for that particular layer. An array of threaded passages extend through the rigid support.

Each of the threaded passages is engaged by a threaded post formed of a magnetically-attractive material, these threaded posts extending perpendicularly to the reference plane. Each threaded post terminates in a cylindrical end having a planar end surface that is parallel to the reference plane. The threaded posts can be adjusted relative to the threaded passages, but are retained in position once adjusted to maintain their positions. In some embodiments, the threaded passages are provided by self-locking nuts affixed to the rigid support, and the self-locking nature serves to maintain the threaded posts in position unless deliberately adjusted by the user applying sufficient torque with a driving tool to overcome the self-locking engagement. In other embodiments, the threaded posts are non-rotatably mounted to the shafts of servo motors that can be controlled to automatically adjust the parallelism of the platform surface relative to the print head plane.

The platform surface is provided on a substantially planar platform which attaches to the threaded posts extending from the rigid support. The platform is typically a smooth material such as metal, glass, or a relatively rigid polymer such as acrylic or polycarbonate. The platform may be clamped to a metal subframe, particularly when a glass platform is employed. The platform is provided with an array of mounting elements that are affixed to the platform in positions that match those of the threaded posts extending from the rigid support. Each of the mounting elements is provided with a cylindrical recess that is sized to closely engage the cylindrical end of one of the threaded posts, so as to maintain registry of the platform with respect to the rigid support. Each recess also has a bearing surface provided on a rare-earth supermagnet mounted in the cylindrical recess. The supermagnet provides a magnetic attraction force sufficient to maintain itself in engagement against the planar end of the threaded post as the threaded post is adjusted to vary the local distance of the platform from the rigid support, while still allowing the platform to be removed and replaced.

While providing threaded posts and corresponding mounting elements at the corners of the platform assembly may provide sufficient flatness for small build platforms, larger build platforms benefit from being able to adjust the local distance of the platform from the rigid support across the surface of the platform, in order to achieve a high degree of conformation to a plane. This high degree of flatness helps to overcome problems of peeling associated with uneven thickness in the initial layer of material applied to the platform surface. In such cases, a high degree of flatness can be provided by adjusting the separation distance of the platform relative to the rigid support at one or more intermediate locations in addition to locations at the corners of the platform. To manually level the platform and assure sufficient flatness of its surface when employing adjustment structures such as discussed above, the operator can mount a contact gauge onto the structure that supports the print head and move it sequentially to the location of each of the threaded posts, adjusting the threaded posts to zero the level of the platform at that location, without requiring that the screws be subsequently adjusted once that location is zeroed. In an automated device, a distance gauge associated with the print head can be moved sequentially by a controller to the locations of the threaded posts, and the threaded post at each location is adjusted by the servo motor to which it is attached to set the distance at that location to a set value. The position of the servo motor shaft can then be recorded and the motor monitored to automatically return the shaft to the desired position if it becomes angularly displaced during use.

Thus, the platform assembly of the present invention provides an adjustable platform surface that can be readily adjusted relative to the movement plane of the print head to provide a platform surface that is both flat and parallel, and which maintains such character during repeated use to reduce the frequency of readjustment.

BRIEF DESCRIPTION OF THE FIGURES

FIG. 1 illustrates the overall platform assembly and its incorporation into the printer.

FIG. 3 shows the mounting element exploded.

FIG. 6 illustrates the platform assembly installed in the printer.

DETAILED DESCRIPTION

Figure 1:
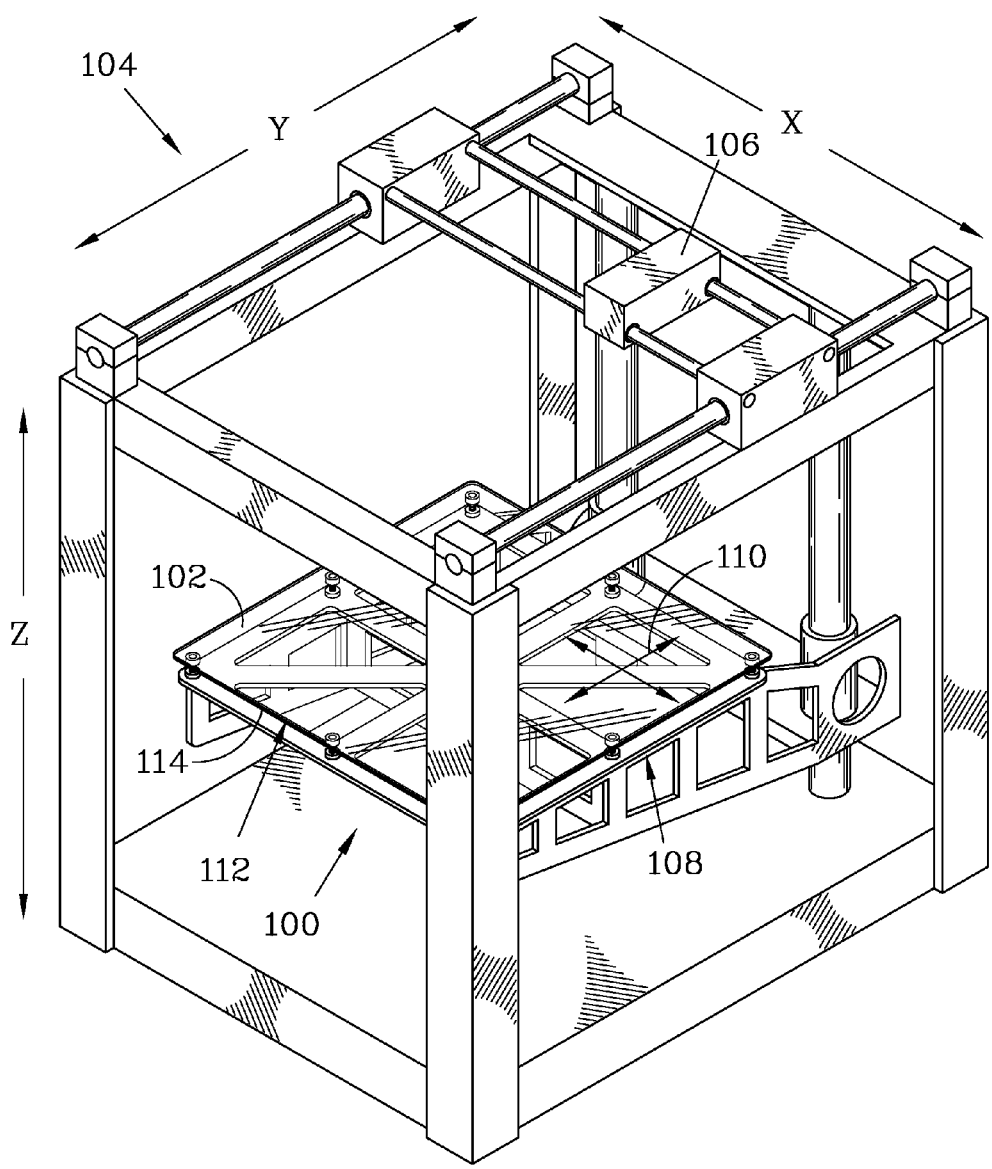
FIG. 1 is an isometric view illustrating a platform assembly that forms one embodiment of the present invention, and which provides a build platform for a 3D printer. The platform assembly can be manually adjusted to assure that the build surface of the 3D printer resides substantially within a plane parallel to an X-Y plane in which a print head of the printer moves.
Figure 2:
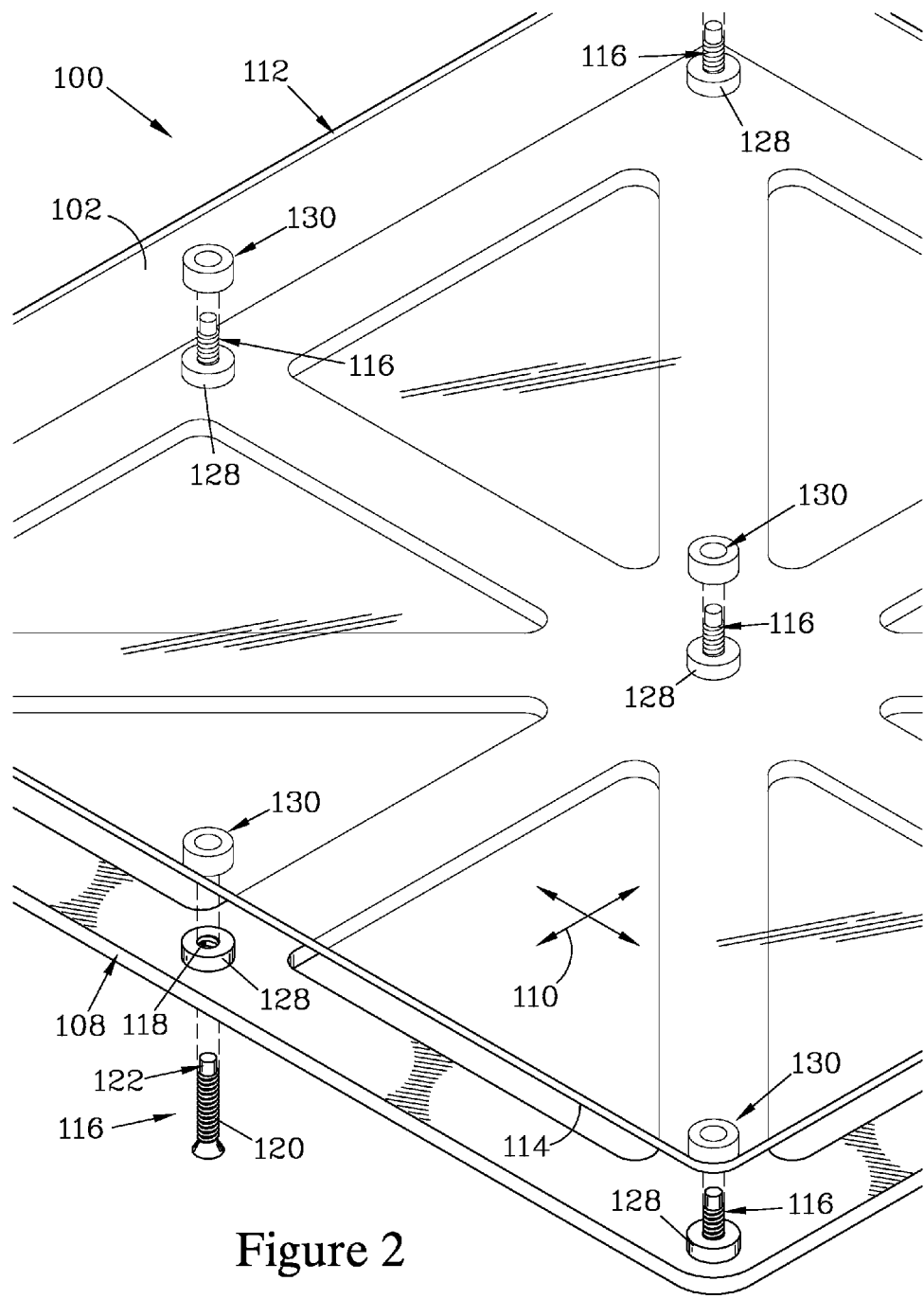
FIG. 2 is a more detailed partial view of the platform assembly shown in FIG. 1, which has a rigid support and a platform (which is formed by a sheet of glass in this embodiment). An array of threaded posts are adjustably mounted in threaded passages provided in the rigid support, and engage a matching array of mounting elements attached to the glass platform to adjust the separation of the platform from the rigid support at multiple locations.

FIGS. 1 and 2 illustrate a platform assembly 100 that forms one embodiment of the present invention for providing a platform surface 102 that can be adjusted to conform to a plane within a specified tolerance in the range of a thousandth of an inch. The platform assembly 100 is particularly well suited for providing a build platform for a three-dimensional printer 104, as shown in FIG. 1. In the printer 104 illustrated, a print head 106 is movable along X and Y axes, while a rigid support 108 of the platform assembly 100 is movably mounted so as to provide motion along a Z axis. In other printers, the rigid support 108 could be mounted so as to also provide the motion along either the X axis or the Y axis. The rigid support 108 extends generally along a reference plane 110 that is perpendicular to the Z axis.

A platform 112 is mounted to the rigid support 108, and the platform surface 102 is provided on the platform 112, which also has a mounting surface 114 that faces the rigid support 108. In this embodiment, the platform 112 is formed by a piece of transparent glass having a thickness selected to allow the platform 112 to be slightly deformable.

Figure 3:
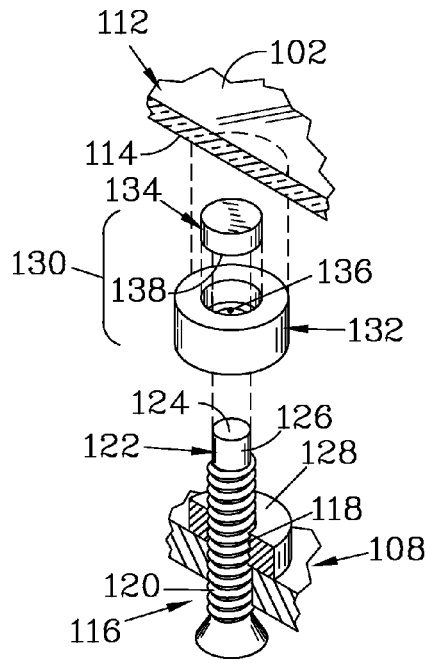
FIG. 3 is a partially exploded view showing one of the threaded posts mounted to the rigid support shown in FIGS. 1 and 2, and the corresponding mounting element that attaches to the platform. The threaded passages in the rigid support are provided by self-locking nuts that allow the threaded posts to be adjusted, but which firmly hold them in place during use. Each threaded post terminates in a cylindrical end with a planar end surface, and each mounting element has a cylindrical recess sized to accept the end of the threaded post. A supermagnet is provided in each mounting element to provide a bearing surface in the recess that is positioned to rest against the planar end surface of the threaded post.

As better shown in FIG. 2, an array of threaded posts 116 extend through threaded passages 118 that are provided in the rigid support 108; the threaded passages 118 extend perpendicularly to the reference plane 110. The threaded posts 116 are formed from a magnetically attractive material, and in this embodiment can be provided by "dog point" or "pilot point" set screws such as are commercially available. In the platform assembly 100, nine threaded posts 116 are employed (only five of which are visible in FIG. 2). As better shown in the detail views of FIGS. 3-5, each of the threaded posts 116 has a threaded portion 120 and a cylindrical end portion 122. The threaded portion 120 engages one of the threaded passages 118 so as to advance or retract the threaded post 116 in a direction parallel to the Z axis as the threaded post 116 is rotated. The end portion 122 has a planar end surface 124 and a cylindrical sidewall 126, where the cylindrical sidewall 126 is centered on an axis (not shown) that is perpendicular to the planar end surface 124.

The threaded passages 118 are aligned such that the planar end surfaces 124 of the threaded posts 116 are parallel to the reference plane 110 (shown in FIGS. 1 and 2). Rotation of the threaded posts 116 in the threaded passages 118 adjusts the separation of the planar end surfaces 124 from the reference plane 110. To retain the desired separation once adjusted, means for resisting rotation of the threaded posts 116 are provided. In the platform assembly 100, such means are provided by an array of self-locking nuts 128 that are affixed to the rigid platform 108, and which provide the threaded passages 118. These self-locking nuts 128 are configured to grippably engage the threaded portions 120 of the threaded posts 116 to prevent rotation unless a torque of sufficiently large magnitude is applied to the threaded post 116. Commercially available self-locking nuts 128 have been found to provide sufficient resistance to maintain the position of the threaded posts 116 in the threaded passages 118 through multiple printing operations, thereby reducing the frequency of readjustment by the operator of the printer 104.

Figure 4:
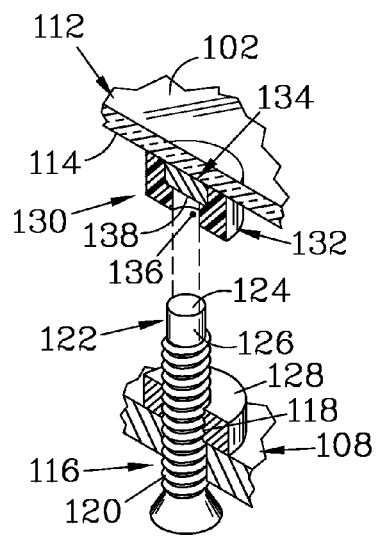
FIG. 4 illustrates the components shown in FIG. 3 when the mounting element is assembled and attached to the platform. The mounting element is shown sectioned to illustrate the bearing surface in the recess formed by the supermagnet.
Figure 5:
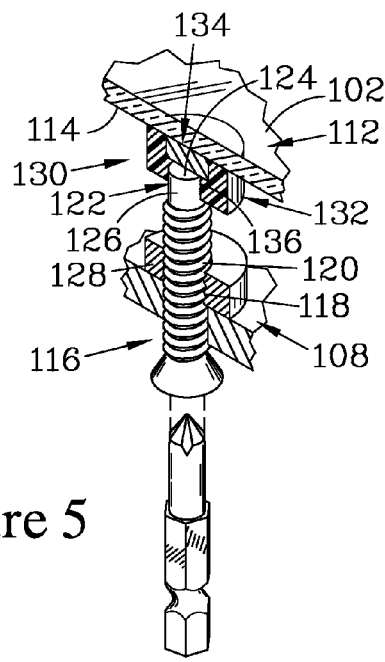
FIG. 5 illustrates the components shown in FIGS. 3 and 4 when the threaded post has been engaged with the mounting element. The supermagnet maintains the engagement, and provides a sufficient magnetic moment to deform the glass platform to remain in contact with the threaded post while accommodating adjustment of the extension of the threaded post from the rigid support.

The platform 112 is provided with an array of mounting elements 130, each having a mounting body 132 with a magnet 134 mounted therein. As shown in FIGS. 2, 4, and 5, the mounting elements 130 are affixed to the mounting surface 114 of the platform 112 in positions that match those of the threaded posts 116 extending from the rigid support 108. The mounting body 132 is formed with a cylindrical recess 136, and the magnet 134 is mounted in the recess 136 so as to provide a magnet bearing surface 138 that terminates the recess 136. The recess 136 is configured to slidably engage the cylindrical sidewall 126 of one of the threaded posts 116, and the magnet bearing surface 138 is positioned to abut against the planar end surface 124 of the threaded post 116, as shown in FIG. 5. Since the threaded post 116 is formed from a magnetically-attractive material, the magnet 134 creates a magnetic moment that serves to maintain its magnet bearing surface 138 engaged against the planar end surface 124 as the position of the threaded post 116 is adjusted. It has been found that rare earth supermagnets provide sufficient magnetic moment to cause deformation of the glass platform 112 to allow the magnet bearing surface 138 to remain in contact with the threaded post 116, and thus to adjust the separation of the platform surface 102 from the reference plane 110 at that location as the threaded post 116 is advanced or retracted in the associated threaded passage 118. The strength of the magnets 134 that is required depends on the stiffness and thickness of the platform 112. Because the platform 112 is attached relative to the rigid support 108 by the magnets 134, it can be readily removed and replaced with a similar platform to allow the printer 104 to begin a new printing operation. The engagement of the end portions 122 of the threaded posts 116 with the recesses 136 assures that the platform 112 remains registered with respect to the rigid support 108, and thus is registered with respect to the movement of the print head 106 as it moves in the X-Y plane. Preferably, the threaded passages 118 are arranged to allow attaching the platform 112 in more than one orientation. While the platform 112 of the platform assembly 100 is formed from a sheet of glass with the mounting elements 130 affixed thereto, alternative materials such as metal could be employed, and the mounting elements 130 could be affixed to a subframe to which a sheet of suitable material is clampably attached, such as by spring clips; however, such embodiments may have difficulty in allowing the glass to conform to the subframe when an intermediate threaded post is retracted relative to the surrounding posts. It should be noted that, if alternative materials are employed for the platform 112, the strength and size of the magnets 134 should be adjusted to correspond to the deformability of the platform 112.

Figure 6:
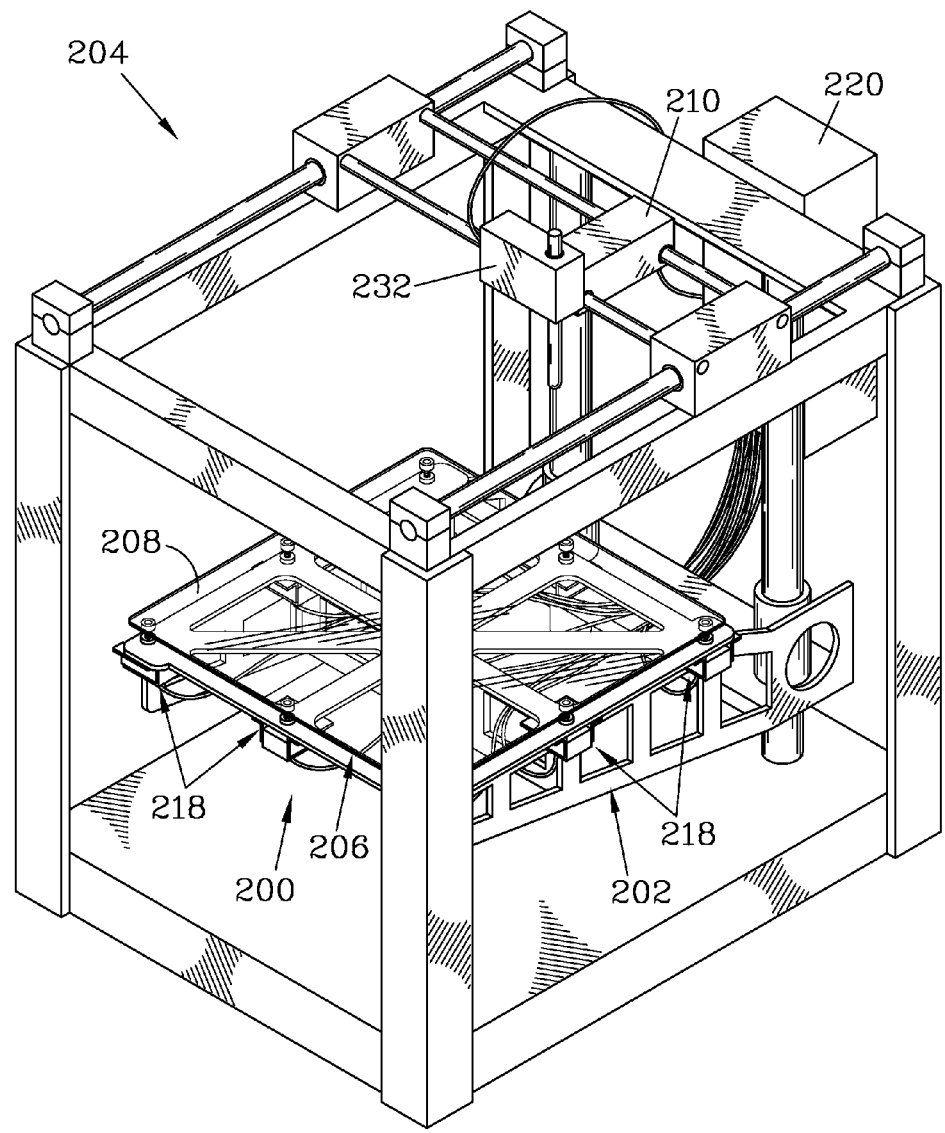
FIGS. 6 is an isometric view illustrating a platform assembly that forms another embodiment of the present invention, and which employs an alternative scheme for maintaining the adjustment of an array of threaded posts. In this embodiment, the threaded posts are turned by servo motors, and the extension of each of the threaded posts above a rigid support can be adjusted automatically to assure that the contour of a build surface resides substantially within a plane parallel to the plane in which the print head moves.

To help assure proper adhesion of an initial layer of material applied by the print head 106 onto the platform surface 102, the platform surface 102 should be adjusted such that it is parallel to the X-Y plane in which the print head 106 moves to allow the print head to apply an initial layer of material having a uniform thickness. Such adjustment can be readily achieved by attaching a distance gauge (such as shown in FIG. 6 and discussed below) to the print head 106 and moving it in the X-Y plane to the location over a first one of the mounting elements 130. The corresponding threaded post 116 is then turned using a suitable driving tool (such as shown in FIG. 5) until the distance gauge indicates a desired separation distance of the platform surface 102 from the print head 106. The print head 106 is then moved to positions above each of the other mounting elements 130 and the threaded posts 116 at those locations are each adjusted to obtain the same separation distance.

For smaller platform sizes measuring less than about six inches in either dimension, it may be sufficient to employ mounting elements and threaded posts only at the corners of the platform and rigid support. However, when the size of the platform is such that it has a dimension greater than about six inches (for a glass platform), adjustment of the separation at locations between the corners provides a benefit in assuring that the platform surface conforms closely to a true plane; the dimensions where such flatness is beneficial may depend on the thickness of the layers to be applied. While such intermediate adjustment might be provided by conventional adjustment structures such as the use of set screws tensioned by springs, the adjustment structure discussed above is felt to provide a benefit in ease of adjustment and retention of the adjusted position through multiple printing operations.

In a prototype platform assembly similar to that shown in FIGS. 1 and 2, measuring 305 mm×305 mm, nine M5×20 mm dog point screws were employed for the threaded posts. The threaded passages were provided by Trident® press-in self-locking nuts, available from Penn Engineering as part no. SL-M5-1ZI. While welded nuts could be employed, press-fitted nuts are felt to provide more precise positioning when the rigid support is provided with machined passages to receive the nuts. Precise positioning of the threaded passages and the threaded posts allows the associated mounting elements on the platform to be positioned in a pattern that allows the removable platform to be mounted in either of two (rectangular platform) or four (square platform) orientations, making it easier for the operator to position the platform. The rigid support was formed from ⅛" (3 mm) thick steel sheet.

In this prototype, a piece of conventional mirror glass was employed for the platform, and it is felt that glass sheet up to ⅛" thick could be employed. Alternative materials providing a slightly flexible planar structure could be employed, and could include thin metal sheet, and relatively rigid polymer materials such as acrylic or polycarbonate sheet. The mounting assemblies employed rare earth supermagnets measuring 8 mm diameter×3 mm thick, which are rated as providing a 2.9 lbs. pull.

Figure 7:
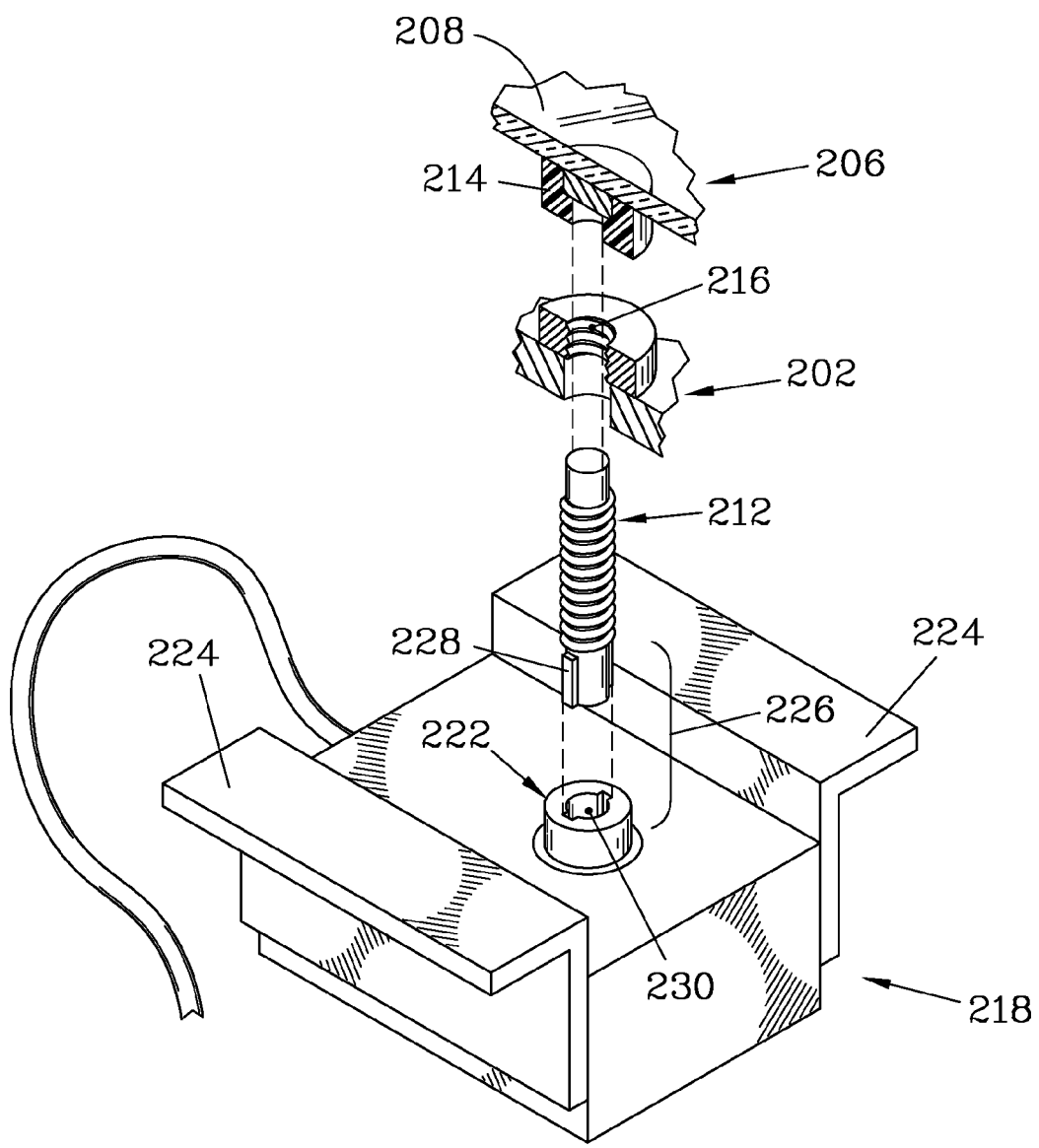
FIG. 7 is a partially exploded view showing one of the threaded posts, threaded passages, and corresponding mounting elements employed in the embodiment shown in FIG. 6 to adjust the separation of the platform from the rigid support. The threaded passages in this embodiment do not grippably engage the threaded posts, and each threaded post is adjusted and maintained in position by the servo motor, which in turn is affixed to the rigid support. To accommodate axial motion of the threaded post as it is advanced or retracted in the threaded passage on the rigid support, the threaded post is coupled to a motor shaft of the servo motor by a spline connection that allows the motor shaft to rotate the threaded post.

FIGS. 6 and 7 illustrate a platform assembly 200 that provides an alternative embodiment that employs an alternative structure for maintaining the adjustment of a build surface for a 3D printer; in the assembly 200, the adjustment procedure can be automated. The platform assembly 200 again employs a rigid support 202 that is movably mounted in a printer 204 and which supports a platform 206 having a platform surface 208 that serves as a build surface onto which material is applied in layers by a print head 210.

In the platform assembly 200, the platform 206 is again connected to and separated from the rigid support 202 by the engagement of an array of threaded posts 212 (one of which is shown in FIG. 7) with a corresponding array of mounting elements 214. Again, the threaded posts 212 are engaged in threaded passages 216 through the rigid support 202, but in this embodiment the threaded passages 216 do not have a self-locking character, and can be provided by conventional nuts or threaded inserts, or could be machined directly into the rigid support 202. The mounting elements 214 are affixed to the platform 206, and are essentially similar to the mounting elements 130 discussed above.

Adjustment of the positions of the threaded posts 212, as well as resistance to rotation, are provided by an array of servo motors 218, each of which controls the position of one of the threaded posts 212 under the operation of a servo control system 220, shown in FIG. 6. Each of the servo motors 218 is affixed to the rigid support 202 such that a motor shaft 222 of the servo motor 218 is aligned with one of the threaded passages 216. The servo motor 218 can be attached via various means, such as by a pair of servo brackets 224 that attach to both the servo motor 218 and to the rigid support 202 with adhesive or mechanical fasteners. Since the servo motors 218 are affixed to the rigid support 202, there is a need to provide axial motion between the threaded posts 212 and the motor shafts 222 to allow the threaded posts 212 to be threadably advanced and retracted in the threaded passages 216 as the threaded posts 212 are rotated. Such axial motion can be provided by a spline connection 226 between each of the threaded posts 212 and the associated one of the motor shafts 222. The spline connection 226 has a male spline member 228, which is illustrated as being provided on the threaded post 212, and a female spline member 230, which is shown as being incorporated into the motor shaft 222. The spline members (228, 230) are slidably movable with respect to each other along an axis of rotation of the motor shaft 222, but are not rotatable with respect to each other. Thus, the motor shaft 222 is able to apply torque to the threaded post 212 via the spline connection 226, while allowing the threaded post 212 to advance and retract in the threaded passage 216 as the threaded post 212 is rotated.

The servo control system 220 can employ a variety of schemes to adjust the positions of the threaded posts 212 and to retain them in the desired positions to maintain the desired flatness and parallelism of the platform surface 208. In one scheme, an electronic distance gauge 232 is mounted to the print head 210, and a routine instructs the printer 204 to move the print head 210 so as to place the distance gauge 232 over the location of one of the mounting elements 214. The servo control system 220 then operates the servo motor 218 at that location to advance or retract the threaded post 212 until a desired distance between the print head 210 and the platform surface 208 is achieved. The routine then instructs the printer 204 to move the print head 210 to the location of another mounting element 214, and the adjustment process is repeated at each new location until the separation distance of the platform surface 208 has been adjusted at the location of each of the mounting elements 214 and corresponding threaded posts 212. To retain the threaded posts 212 in the desired locations, the servo control system 220 can record the rotational position of each of the servo motors 218 when the adjustment procedure has been completed, and then check the position at periodic intervals, such as after each printing operation. If the motor shaft 222 is indicated as having moved from the desired recorded rotational position, the servo motor controller 220 can operate the servo motor 218 to return the motor shaft 222 to the desired rotational position.

While the platform assembly of the present invention is discussed above with respect to a 3D printer that deposits material from a print head onto a substrate surface, the platform assembly may provide a benefit for build platforms for other types of 3D printers, and may have other applications where it is desired to provide a surface that can be readily adjusted to conform to a plane and which retains its planar character during use. Additionally, while the novel features of the present invention have been described in terms of particular embodiments and preferred applications, it should be appreciated by one skilled in the art that substitution of materials and modification of details can be made without departing from the spirit of the invention.

What is claimed is:

1. A platform assembly having a high-precision planar surface serving as a build platform for a three-dimensional printer, the platform assembly comprising:
   a support extending along a reference plane and having an array of threaded passages extending therethrough and extending perpendicularly to the reference plane;
   a plurality of threaded posts formed of a magnetically attractive material, each of said threaded posts having an end portion defined by,
      a planar end surface, and
      a cylindrical sidewall that is symmetrical about an axis that is perpendicular to said planar end surface,
         each of said threaded posts threadably engaging one of said threaded passages in said support such that said planar end surface is parallel to the reference plane;
   means for resisting rotation of each of said threaded posts in an associated one of said threaded passages to retain the position of said threaded post once adjusted relative to said threaded passage;
   a planar platform having a working surface and a mounting surface;
   a plurality of mounting elements affixed to said mounting surface of said platform and arrayed thereon so as to match the positions of said threaded posts, each of said mounting elements having,
      a cylindrical recess configured to rotatably but not translatably engage said cylindrical sidewall of one of said threaded posts, and
      a magnet positioned in said cylindrical recess so as to be fixed in position relative to said platform, said magnet having a planar magnet bearing surface positioned to abuttably engage said planar end surface of said threaded post engaged with said recess, said magnet providing sufficient magnetic force to cause flexing of said platform to maintain said magnet bearing surface in contact with said planar end surface as said threaded post is advanced or retracted in said threaded passage, thereby adjusting the local position of said platform relative to said support as said threaded post is advanced or retracted.

2. The platform assembly of claim 1 wherein said means for resisting rotation of each of said threaded posts in an associated one of said threaded passages further comprises:
an array of self-locking nuts affixed to said support, each of said self-locking nuts having one of said threaded passages extending therethrough,
said self-locking nuts each engaging an associated one of said threaded posts in a lockable manner so as to prevent rotation of said threaded post therein unless a torque above a specified threshold is applied to said threaded post.

3. The platform assembly of claim 2 wherein said array of threaded passages is configured such that said plurality of mounting elements can be matched to said threaded posts passing through said threaded passages in more than one orientation.

4. The platform assembly of claim 3 wherein at least one of said threaded passages is positioned so as to be interposed between another two of said threaded passages.

5. The platform assembly of claim 1 wherein said means for resisting rotation of each of said threaded posts in an associated one of said threaded passages further comprises:
an array of servo motors mounted to said support, each of said servo motors driving a motor shaft;
a coupling structure connecting each of said motor shafts to an associated one of said threaded posts, each coupling structure allowing axial motion of said threaded post with respect to said motor shaft but blocking rotational motion therebetween; and
at least one controller for controlling said servo motors to rotate said threaded posts to maintain said threaded posts in desired locations.

6. A platform assembly having a surface adjustable to provide a high degree of conformance to a plane and serving as a build platform for a three-dimensional printer, the platform assembly comprising:
a support extending along a reference plane;
a planar platform having a working surface and a mounting surface;
a plurality of adjustment structures operably connected between said support and said mounting surface of said platform so as to adjust the local position of said platform relative to said support, each of said adjustment structures having,
a self-locking nut affixed to said support and having a threaded passage extending therethrough;
a threaded post formed of a magnetically attractive material and having an end portion defined by,
a planar end surface, and
a cylindrical sidewall that is symmetrical about an axis that is perpendicular to said planar end surface,
said self-locking nut engaging said threaded post in a lockable manner so as to prevent rotation of said threaded post therein unless a torque above a specified threshold is applied to said threaded post;
a mounting element affixed to said mounting surface of said platform and positioned thereon so as to match the position of said threaded post, said mounting element having,
a cylindrical recess configured to rotatably but not translatably engage said cylindrical sidewall of said threaded post, and
a magnet positioned in said recess so as to be fixed in position relative to said platform, said magnet having a planar magnet bearing surface positioned to abuttably engage said planar end surface of said threaded post,
said magnet providing sufficient magnetic force to cause flexing of said platform to maintain said magnet bearing surface in contact with said planar end surface as said threaded post is advanced or retracted in said threaded passage, thereby adjusting the local position of said platform relative to said support as said threaded post is advanced or retracted.

* * * * *